United States Patent [19]

Ellwood

[11] Patent Number: 4,640,672

[45] Date of Patent: Feb. 3, 1987

[54] MODULAR EXTRUDER BARREL CONSTRUCTION

[75] Inventor: Henry Ellwood, Rochdale, England

[73] Assignee: Farrel Corporation, Ansonia, Conn.

[21] Appl. No.: 756,514

[22] PCT Filed: Nov. 20, 1984

[86] PCT No.: PCT/GB84/00396

§ 371 Date: Jul. 3, 1985

§ 102(e) Date: Jul. 3, 1985

[87] PCT Pub. No.: WO85/02364

PCT Pub. Date: Jun. 6, 1985

[30] Foreign Application Priority Data

Nov. 26, 1983 [GB] United Kingdom ............... 8331653

[51] Int. Cl.[4] ............................................. B29B 7/13
[52] U.S. Cl. ................................. 425/192 R; 366/79;
425/205; 425/208
[58] Field of Search ............... 425/200, 205, 208, 182,
425/184, 168, 185, 190, 192 R; 366/79

[56] References Cited

U.S. PATENT DOCUMENTS 4,408,887 10/1983 Yamaoka ............................... 366/75

FOREIGN PATENT DOCUMENTS 2654774 6/1978 Fed. Rep. of Germany .
1133446 3/1957 France .
1050205 12/1966 United Kingdom .
1440682 6/1976 United Kingdom .
401529 4/1974 U.S.S.R. .

Primary Examiner—Donald Czaja
Assistant Examiner—Jennifer Cabaniss
Attorney, Agent, or Firm—G. Kendall Parmelee; George W. Rauchfuss, Jr.

[57] ABSTRACT

An extruder (2) comprising an extruder barrel comprising a plurality of barrel modules (4), each provided with an inner lining material (16), and at least one plate (6) is described. Such an arrangement facilitates assembly and dismantling of the barrel for replacement of inner parts. In a preferred embodiment, a plate (6) having an opening (26) passing therethrough and comprising projections (30) extending into said opening, is interposed between each two adjacent barrel modules (4), the openings of the plates (6) and internal surfaces of the barrel modules forming a substantially continuous passageway which provides an extrusion chamber (3). The plates (6) are provided with a plurality of bore holes around the circumference thereof arranged to correspond with bore holes located in external flanges (12) extending around end portions of the barrel modules, so that said plates and barrel modules may be sealingly secured together by the insertion of fastening means (28) into aligned bore holes of the plates and barrel modules.

5 Claims, 6 Drawing Figures

MODULAR EXTRUDER BARREL CONSTRUCTION

This invention is concerned with an extruder barrel construction for an extruder, especially an extruder suitable for homogenising and extruding plastics or rubber materials.

TECHNICAL FIELD

In the field of extruders it is known to enhance the homogenisation of materials by providing in the extrusion chamber a screw having interrupted helical flights and obstacles projecting from the sides of the chamber arranged to cooperate with the flights of the screw, namely so-called "pin-barrel" extruders.

BACKGROUND ART

U.K. Pat. No. 1440682 for example, discloses one such single screw extruder for mixing and homogenising viscous materials wherein the extrusion zone of the extruder comprises a screw having two discontinuous flights enclosed in an extruder barrel containing a series of obstacles projecting from the sides thereof towards the root of the screw. The interruption of the flights thus provides channels at the root of the screw into which the series of obstacles project. Each series of obstacles comprises eight obstacles distributed around the circumference of the barrel.

As a result of extensive wear of the internal surface of the extruder barrel caused by abrasion and wear as the flights convey the material to be homogenised through the extrusion chamber, it is common practice to provide a very hard and wear-resistant lining. Such linings may be of bi-metallic material and are very brittle. They are also very expensive to produce. For those extruders heretoforeknown comprising obstacles projecting into the extrusion chamber, it is necessary to drill holes through both the sides of the barrel and the hard lining material so that the obstacles may be inserted into the holes thus provided and secured therein by fastening means. Drilling of holes through the lining is difficult if damage to the lining is to be avoided; damage to the lining can lead to unsatisfactory performance and, if severe, may necessitate provision of a new lining.

As a result of breakage of one or more of the obstacles, thus requiring replacement thereof, or wear or damage to the lining material, it is commonly necessary to replace the lining material and/or obstacles. Such a process is time consuming and laborious, involving removing the lining from the barrel (also, if any of the obstacles have been bent, removing and replacing these may be a problem), providing a new lining in replacement and furthermore drilling holes in the lining to accommodate the obstacles. In a large bore extruder this may prove to be very expensive both in capital outlay and lost production time.

It is an object of this invention to provide an improved extruder which may be assembled and dismantled easily for replacement of inner parts.

DISCLOSURE OF THE INVENTION

The invention provides in one of its aspects an extruder comprising a plurality of barrel modules arranged in alignment, at least two adjacent barrel modules having a plate secured therebetween, the plate having an opening passing therethrough and comprising projections extending into said opening, the opening of the plate and internal surfaces of the barrel modules forming a substantially continuous passageway which provides an extrusion chamber of a barrel of the extruder, and a screw in the extrusion chamber having one or more helical flights projecting from a root portion of the screw, the flights being discontinuous and arranged to leave annular spaces between adjacent flight sections into which the projections extend towards the root of the screw.

An extruder according to the invention may be of any convenient size with respect to the diameter of the extrusion chamber and the length thereof, however it is envisaged that the construction according to the invention will particularly be used in large extruders where there is a high cost in terms of time and materials in replacing the lining material. The invention is particularly suitable for extruders having an extrusion chamber greater than twenty centimeters in diameter.

For ease of construction of an extruder barrel, in an extruder according to the invention, which is preferably assembled around the screw, the plate interposed between two barrel modules preferably comprises two or more parts which are releasably secured together. We prefer to use a plate comprising two parts, more preferably two semi-circular parts. The two or more parts of the plate are preferably interchangeable in order that they may be used in substitution for one another. The projections of the plate which extend into the opening thereof may be of any desired shape for example of square or circular cross-section. Also it may prove advantageous to provide projections of different shapes in a particular section of, or throughout, the barrel.

The plate may comprise any convenient number of projections. For a plate comprising two semi-circular parts we prefer to have an even number of projections. For maximum effect we prefer to employ a plate having from 4 to 12 projections. The projections may be provided, if desired, with pressure transducers and thermocouples to measure the conditions of pressure and temperature existing within the extruder barrel. As the plates are individual parts they may be produced from a variety of materials, chosen according to the desired use.

The extruder barrel is conveniently constructed by interposing a plate between at least two adjacent barrel modules of the plurality of aligned barrel modules and securing it therebetween in sealing relationship therewith, so that no material may leak from the extruder barrel at the junctions of plate and barrel modules or, where a multi-part plate is used, between joints in the plate. The barrel modules are provided with external flanges extending around end portions thereof, the flanges containing a plurality of bore holes which correspond to bore holes passing through the plate around the external circumference thereof. The plate is secured between two adjacent barrel modules in sealing relationship by fastening means inserted in aligned bore holes of the plate and external flanges.

In a preferred form, an extruder according to the invention comprises a plurality of plates, each plate being secured between two adjacent barrel modules. In order to attain satisfactory homogenisation of the material contained therein, we prefer to construct the extruder barrel so that a plate is interposed between each two adjacent barrel modules in a homogenisation zone of the barrel. Conveniently the plates are interchangeable so that they may be used in substitution for one another as desired.

The barrel modules of an extruder according to the invention preferably each comprises an outer shell having external flanges extending around end portions thereof and a lining material slideably received within said outer shell. The lining material is composed of a hard, wear resistant material and suitably comprises a self-supporting material which may be inserted into or removed from the outer shell of the barrel module as desired. Conveniently the outer shell comprises means for retaining the lining material therein, for example in a preferred embodiment, the outer shell comprises an internal flange which supports the self-supporting cylinder of lining material. This arrangement provides a cavity, extending around the lining material between the lining material and the outer shell for heat exchange liquid which is employed to supply heat to or remove heat from the extruder barrel as desired, thereby providing a so-called wet liner. In such a module construction the flow of heat exchange liquid through each module can be controlled, if desired, independently of the other modules, thereby giving improved control of temperature and providing individual temperature zones. Alternatively, a wet liner may be sealed around the extruder barrel by any of the normal methods. The barrel modules may be of any convenient construction. Preferably, however, each of the barrel modules are identical so that they are interchangeable and each may be used in substitution for any one of the other modules, as desired. Where the barrel modules are to be interchangeable, the outer shells and lining material may conveniently be manufactured using numerically-controlled machine tools which facilitate the manufacture of barrel modules that are identical.

Interchangeability of the barrel modules, the plates and the parts thereof is of significant advantage. As the material is conveyed by the helical flights of the screw through the extrusion chamber, some of the parts of the chamber sustain more wear than other parts thereof, for example, the outlet end of the extrusion chamber receives considerably more wear than a central part of said chamber. In some cases it may be convenient to replace a worn or damaged barrel module, a plate or parts thereof, with a new replacement part which has been removed from a part of the extrusion chamber that has sustained less wear. Interchanging of worn with less worn modules ensures that optimum wear is achieved from the modules and provides a significant saving in cost, as compared with an integral barrel construction in which, should part of the lining become too worn, relining of the whole barrel would be necessary at a considerable capital outlay and lost production time. Where the modules are identical production loss can be minimised by keeping one or more spare modules. Also, the provision of a part having a number of projections, which may be inserted into the extruder barrel of an extruder according to the invention in sealing relationship therewith, without the need to drill holes in the lining material for the insertion of projections, avoids the possibility of having to replace the lining material resulting from damage thereto arising from drilling holes in said lining material. This construction also makes it possible to substitute plates with different projections to modify the extruder performance.

The invention provides in another of its aspects a method of constructing an extruder barrel comprising a plurality of barrel modules and at least one plate having an opening passing therethrough and comprising projections extending into said opening, wherein the (or each) plate is interposed and secured between adjacent barrel modules so that the opening of the (or each) plate and internal surfaces of the barrel modules form a substantially continuous passageway providing an extrusion chamber of the barrel. In a preferred method according to the invention the plate or plates comprise bore holes located around the circumference thereof arranged to correspond with the plurality of bore holes provided in external flanges which extend around end portions of the barrel modules, so that two adjacent barrel modules and the interposed plate may be secured together by the insertion of fastening means into aligned bore holes in adjacent flanges and plate.

The invention further provides in another of its aspects a barrel module for use in an extruder according to the invention wherein the barrel module comprises an outer shell having external flanges extending around end portions thereof, and a lining material slideably received within said outer shell, the arrangement being such as to provide a cavity for heat exchange liquid which extends around the lining material between said lining material and the outer shell.

The invention further provides in another of its aspects a plate for use in an extruder according to the invention wherein the plate has an opening passing therethrough and comprises projections extending into said opening and further comprises bore holes passing through the plate around the circumference thereof.

Whereas reference has only been made herein to a single screw extruder it is intended that the construction of the invention may also have application in twin or multiple screw extruders.

There now follows a detailed description to be read with reference to the accompanying drawings, of an extruder suitable for use in the homogenisation and extrusion in shaped form of plastics and rubber materials. It will be realised that this extruder has been selected for description to illustrate the invention by way of example.

MODES FOR CARRYING OUT THE INVENTION

Figure 1:
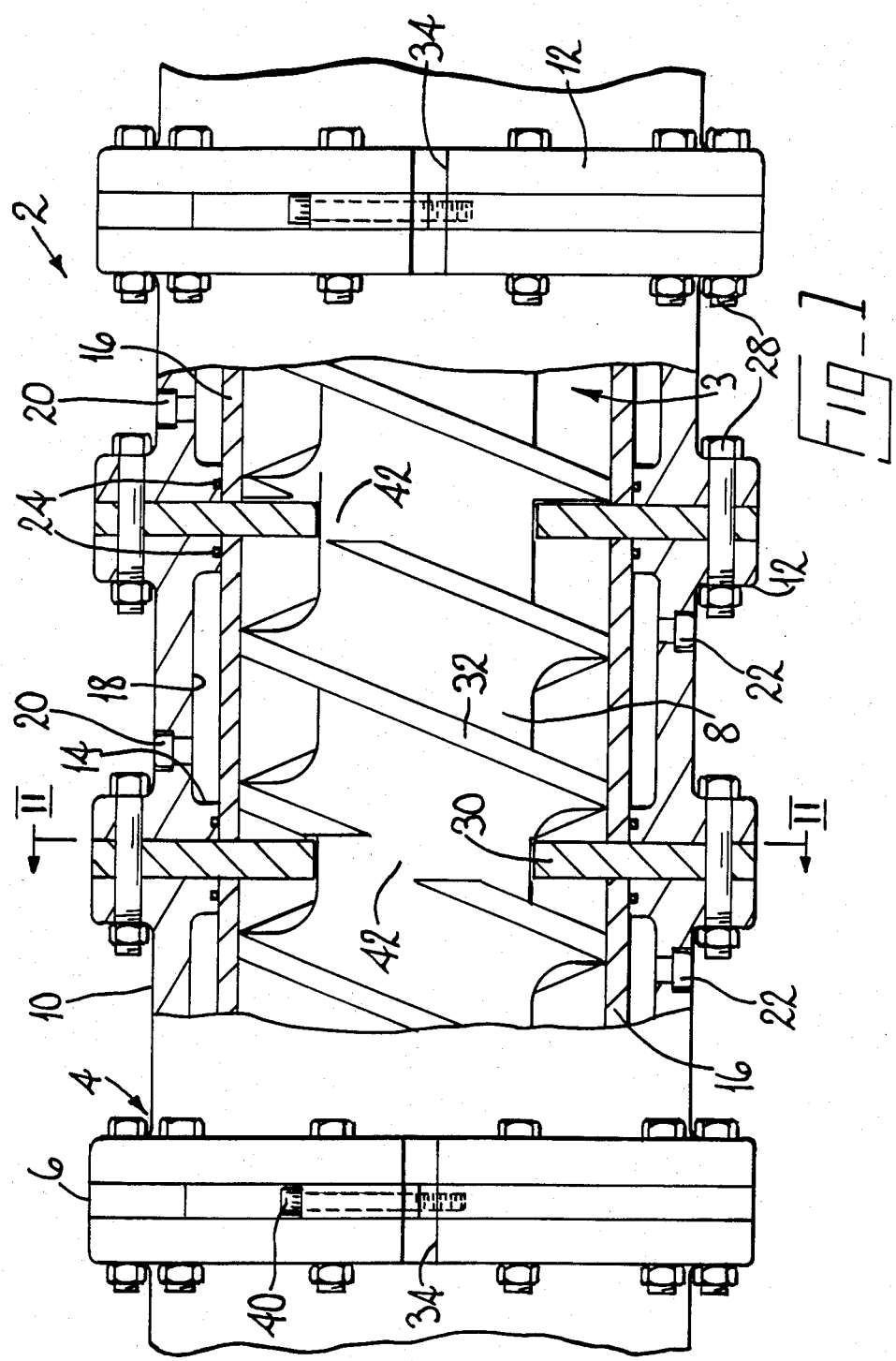
FIG. 1 is a side view partly in section of part of an extruder according to the invention.

The extruder 2 shown in FIG. 1 comprises an extruder barrel and an extruder screw 8. The extruder barrel comprises a plurality of barrel modules 4 and plates 6 arranged in alignment and secured together to form a substantially continuous passageway which provides an extrusion chamber 3 of the barrel.

The barrel modules 4 are of circular section and are identical so that they may easily be interchanged and used in substitution for one another. Each module comprises an outer shell 10 and a lining material 16 adapted to be received within the outer shell 10. The outer shell is provided with two external flanges 12 having a plurality of bore holes, which flanges extend around the circumference of the outer shell one at each end portion thereof. The outer shell 10 is also provided with internal flanges 14, one at each end portion thereof, which extend around the internal circumference of the outer shell 10. The lining material 16 comprising a self-supporting cylinder of 533 mm internal diameter is composed of a suitable wear resistant material, viz. Xalloy, and is slideably received within the outer shell 10. It is retained therein by the internal flanges 14 of the outer shell. This arrangement thus provides a cavity 18 between the lining material 16 and outer shell 10 having inlet and outlet openings 20, 22 for heat exchange liquid which can be arranged to heat or cool the extruder barrel 3, as required. The heat exchange liquid is sealed within the cavity 18 by 'O'rings 24 located in recesses in the internal flanges 14.

Figure 2:
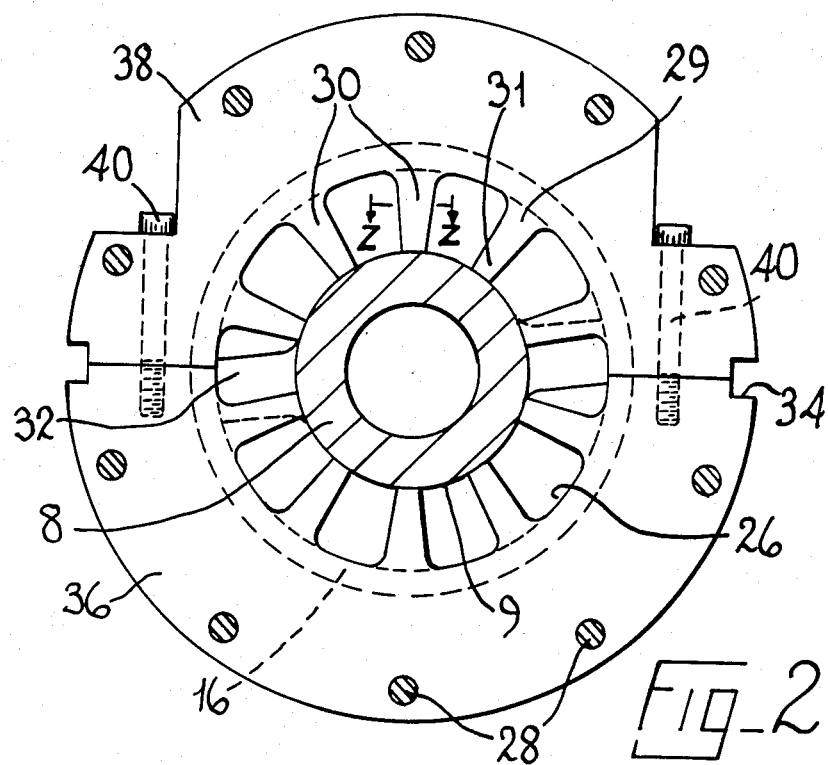
FIG. 2 is a section along the line II—II of FIG. 1.
Figure 3:
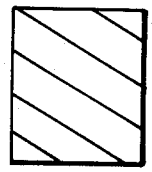
FIG. 3 is a view in section along the line Z—Z of FIG. 2.
Figure 4:
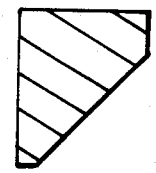
FIGS. 4, 5 and 6 are views in section along the line Z—Z showing alternative projections which might be used in an extruder according to the invention.
Figure 5:
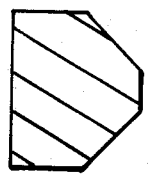
Figure 6:
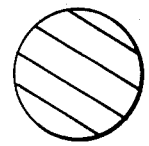

The plates 6 (shown more clearly in FIG. 2) comprise two substantially semi-circular portions 36, 38 and are 5 cm in thickness. The two portions 36, 38 are releasably secured together by two screws 40. Each plate 6 has a circular opening 26 of 533 mm diameter passing therethrough. Bore holes, corresponding to bore holes in the external flanges 12 of the barrel modules 4, passing through the plate parallel to the direction of the opening 26, are provided around the external circumference of the plate 6. The plate is also provided with five pairs of diametrically opposed rectangular projections 30 tapering from 5 cm square at a base portion 29 to 3.8 cm square at a tip portion 31, which extend into the opening 26. When the extruder 2 is assembled the projections 30 extend towards the root 9 of the screw 8 so that only a small gap exists between the tip portions 31 of the projections and the root 9 of the screw 8.

On assembly of the extruder barrel 3, the barrel modules 4 are aligned with a plate 6 interposed between each pair of barrel modules 4 in sealing relationship, so that no material contained within the barrel may leak out at the junctions between the plate, the parts of the plate and the barrel modules. The bore holes of the external flanges 12 and the bore holes of the plate 6 are aligned so that two adjacent barrel modules 4 and the interposed plate may be secured together by the insertion of fastening means 28 provided by nuts and bolts into said bore holes in adjacent flanges and plate.

The screw 8 of the extruder is provided with two discontinuous helical flights 32 projecting from the root 9 of the screw 8, their arrangement leaving an annular space 42 between adjacent flight sections into which the projections 30 extend towards the root of the screw.

The extruder 2 is supported by a support frame (not shown) which engages grooves 34 passing through external flanges 12 of the barrel modules 4 and the plates 6.

The screw 8 is mounted for rotation in bearings carried by the frame (not shown) of the extruder and driven through gear means (not shown) by a suitable motor (not shown) in known manner.

The extruder barrel is assembled around the screw 8 as hereinafter described. A first barrel module 4 encompassing the screw 8 is passed along the length of the screw, the grooves 34 in the external flanges 12 in engagement with the support frame (not shown), until the flanges of a leading end portion of the module abut a sealing face of the frame of the extruder to which the external flange 12 of the leading end portion is secured by bolts. Bolts of the fastening means 28 are then inserted into the bore holes of the flange 12. The two portions 38, 36 comprising the plate 6 introduced from upper and lower directions respectively, are placed adjacent the barrel module 4, with the projections 30 extending towards the root 9 of the screw 8 in the annular space 42, and the bore holes of the plate 6 receiving the bolts of the fastening means carried in bore holes of the external flange 12. The portions 36, 38 are secured together by means of screws 40. A second barrel module 4 encompassing the screw 8 is then passed along the length of said screw until it abuts the plate 6, the bolts projecting from the plate 6 received in the bore holes in the flange 12 of the second module 4; thus the bore holes of both external flanges 12 of the barrel modules are aligned with those of the plate. The flanges and plate are then secured together by application of a nut to each of the bolts. This process is repeated until the complete extruder barrel is formed, a plate 6 following each barrel module 4 in consecutive arrangement.

When it is desired to replace a plate 6 as a result of wear or breakage, etc., the fastening means 28 is unscrewed and withdrawn, and the plate removed from the extruder barrel 3 by unfastening the screw 40 securing portions 38 and 36 together, followed by removal of said portions in upward and downward directions respectively.

A new plate may be substituted therein by reversing the process hereinabove described but without the necessity for completely dismantling the barrel, the two parts of the plate being inserted readily from above and below between two adjacent modules spaced apart sufficiently.

I claim:

1. An extruder characterized by a plurality of barrel modules arranged in alignment, at least two adjacent barrel modules having a plate secured between each pair of adjacent barrel modules, each plate and each barrel module being interchangable, each plate being formed of two or more arcuate parts each plate having an opening passing therethrough and comprising projections extending into said opening, the opening of the plate and internal surfaces of the barrel modules forming a substantially continuous passageway which provides an extrusion chamber of a barrel of the extruder and a screw in the extrusion chamber having one or more helical flights projecting from a root portion of the screw, the flights being discontinuous and arranged to leave annular spaces between adjacent flight sections into which the projections extend towards the root of the screw, the barrel modules being provided with external flanges extending around end portions thereof, the flanges containing a plurality of bore holes which correspond to bore holes passing through a respective part of a plate around the external circumference thereof, so that the plate parts are secured between two adjacent barrel modules by fastening means inserted in aligned bore holes of the plate parts and external flanges, and the plate parts are removable in a radial direction when the fastening means are removed from the plate parts.

2. An extruder according to claim 1 characterized in that the plate comprises at least four projections.

3. An extruder according to claim 2 characterized by at least three barrel modules with a plate secured between each pair of adjacent modules.

4. An extruder according to claim 1 characterized in that each barrel module comprises an outer shell having external flanges extending around end portions thereof, and a lining material slideably received within said outer shell, the arrangement thereby forming a cavity for heat exchange liquid which cavity extends around the lining material between said lining material and the outer shell.

5. A barrel module for use in an extruder according to claim 1 characterized in that the barrel module comprises an outer shell having external flanges extending around end portions thereof, and a lining material slideably received within said outer shell, the arrangement forming a cavity for heat exchange liquid which extends around the lining material between said lining material and the outer shell.

* * * * *